United States Patent
Jensen et al.

(12)

(10) Patent No.: US 6,276,919 B1
(45) Date of Patent: Aug. 21, 2001

(54) AUTOMATED PRETZEL FORMING MACHINE

(75) Inventors: Fred Charles Jensen; Barbara Elizabeth Jensen, both of Chagrin Falls; John Richard Avalon, Middlefield, all of OH (US)

(73) Assignees: Fred C. Jensen; Barbara E. Jensen, both of Chagrin Falls, OH (US)

( * ) Notice: Subject to any disclaimer, the term of this patent is extended or adjusted under 35 U.S.C. 154(b) by 0 days.

(21) Appl. No.: 09/392,238

(22) Filed: Sep. 8, 1999

(51) Int. Cl.[7] ............................... A21D 6/00; A21C 3/06; A21C 3/08

(52) U.S. Cl. ..................... 425/323; 425/327; 425/375; 425/409; 426/499; 426/500; 426/517; 426/302

(58) Field of Search ................... 426/499, 500, 426/502, 302, 517; 425/323, 327, 375, 409

(56) References Cited

U.S. PATENT DOCUMENTS

| | | | |
|---|---|---|---|
| 2,161,267 | * 6/1939 | Young | 425/323 |
| 3,782,876 | 1/1974 | Groff . | |
| 3,799,724 | 3/1974 | Grady . | |
| 3,940,226 | 2/1976 | Verhoeven . | |
| 4,288,463 | 9/1981 | Groff . | |
| 4,536,147 | 8/1985 | Groff . | |
| 4,880,653 | 11/1989 | Keller . | |
| 4,894,002 | 1/1990 | Groff . | |
| 5,009,910 | 4/1991 | Zwicker . | |
| 5,492,708 | 2/1996 | Hemmerich . | |
| 5,494,428 | * 2/1996 | Piller | 426/145 |
| 5,556,660 | * 9/1996 | Schutz | 426/499 |
| 5,580,599 | * 12/1996 | Fehr | 426/499 |
| 5,591,472 | 1/1997 | Cummins . | |
| 5,702,732 | * 12/1997 | Piller | 425/145 |
| 5,766,663 | 6/1998 | Neumann . | |

OTHER PUBLICATIONS

Benzel's Pretzel "How Pretzels Were Invented" www.aasdcat.com/cyber/brbenz.htm.
By Jeanine 1996 "Soft Pretzel Recipe" http://soar.berkeley.edu/recipes/snacks/pretzels04.rec.

* cited by examiner

*Primary Examiner*—Nina Bhat
(74) *Attorney, Agent, or Firm*—James A. Hudak (57) ABSTRACT

An automated pretzel forming machine that produces fresh unbaked pretzels with hand formed characteristics by extruding premixed dough onto a folding table. This table is moved by a bi-directional positioning stage, forming the unfolded and untwisted pretzel shape. The folding table twists the ends of the extruded dough rope then folds the twisted portion on top of the main body of extruded dough resulting in the classic hand twisted pretzel shape. The twisted and folded pretzel is transferred from the folding table through the use of a lift and rotate unit and is subjected to a patterned soda spray and salted before being unloaded from the lift and rotate unit to an existing conveyor oven.

8 Claims, 7 Drawing Sheets

AUTOMATED PRETZEL FORMING MACHINE

BACKGROUND OF THE INVENTION

The current invention addresses the need for automatic pretzel making machinery that forms larger sized pretzels into the classic pretzel shape. The method shown offers a unique way of forming any size pretzel, however our development focus was production of larger gourmet pretzels. There has been much work in the so-called bulk bag bite size pretzels commonly sold in the grocery stores. However many of these production machines do not form the classic pretzel shape. The present invention automates the forming of the pretzel into the classic "child with folded praying arms shape" attributed to circa 610 AD. Because of the difficulty in forming this classic shape, many current automation techniques for bulk pretzel manufacture alter or simplify the shape of the pretzel to achieve the required production rates and capital costs.

The majority of the prior art and inventions cited offer methods, which are not the classic pretzel shape. Of the patents cited, the only ones which wind up with the classic shape are U.S. Pat. Nos. 5,766,663, 5,702,732, 5,556,660, 5,494,428, and 5,009,910. These cited patents use vastly different methods, some more suited to bulk manufacture of smaller pretzels, and some require large capital outlays because of the complexity of the equipment. Also if these cited methods were scaled up to produce the larger gourmet pretzels the resulting floor space and investment in capital equipment make these machines unusable for many point of sale production facilities. Prior art also cited in U.S. Pat. Nos. 4,894,002 and 4,536,147 use an extruder to present the dough and some type of X-Y movement which limits the movement to produce only an altered pretzel shape.

The present invention combines modern automated forming techniques, which results in greater consistency of product, speed of production, with the classic 610 AD "hand formed" pretzel shape.

SUMMARY OF THE INVENTION

It is a general object of the present invention to provide a machine that takes raw pretzel dough and produces a salted unbaked pretzel with the same characteristics as if it were hand formed.

It is another object of the present invention to provide a machine that produces pretzels for point of sale production facilities. That is, the machine is to be compact in size and easy to disassemble and reassemble for daily cleaning It is further the object of the present invention to provide a machine that produces fresh pretzels with hand formed characteristics at a faster rate than if made by hand.

In accordance with the present invention, the hand formed characteristics are achieved through the use of a unique folding table onto which raw dough is extruded and the dough rope shaped through bi-directional motion of the folding table on a bi-directional positioning stage. The folding table also twists the dough then folds it resulting in a pretzel with hand formed characteristics. The raw dough pretzel is subjected to a soda water spray and salting before being unloaded from the machine into a conveyor oven. The application of the soda water causes the pretzel to brown when baked in the oven. Also in accordance with the present invention, all parts that come in direct contact with food items are easily disassembled with no tools for daily cleaning.

The above and other objects, features, and advantages of the present invention will be apparent in the following detailed description of the preferred embodiment when read in conjunction with the accompanying drawings wherein the same reference numerals denote the same or similar parts throughout the several views.

BRIEF DESCRIPTION OF THE DRAWINGS

The accompanying drawings, which are incorporated herein and form a part of the specification illustrate preferred embodiments of the present invention, and together with the description, serve to explain the principles of the invention.

DETAILED DESCRIPTION OF THE PREFERRED EMBODIMENT

Figure 1:
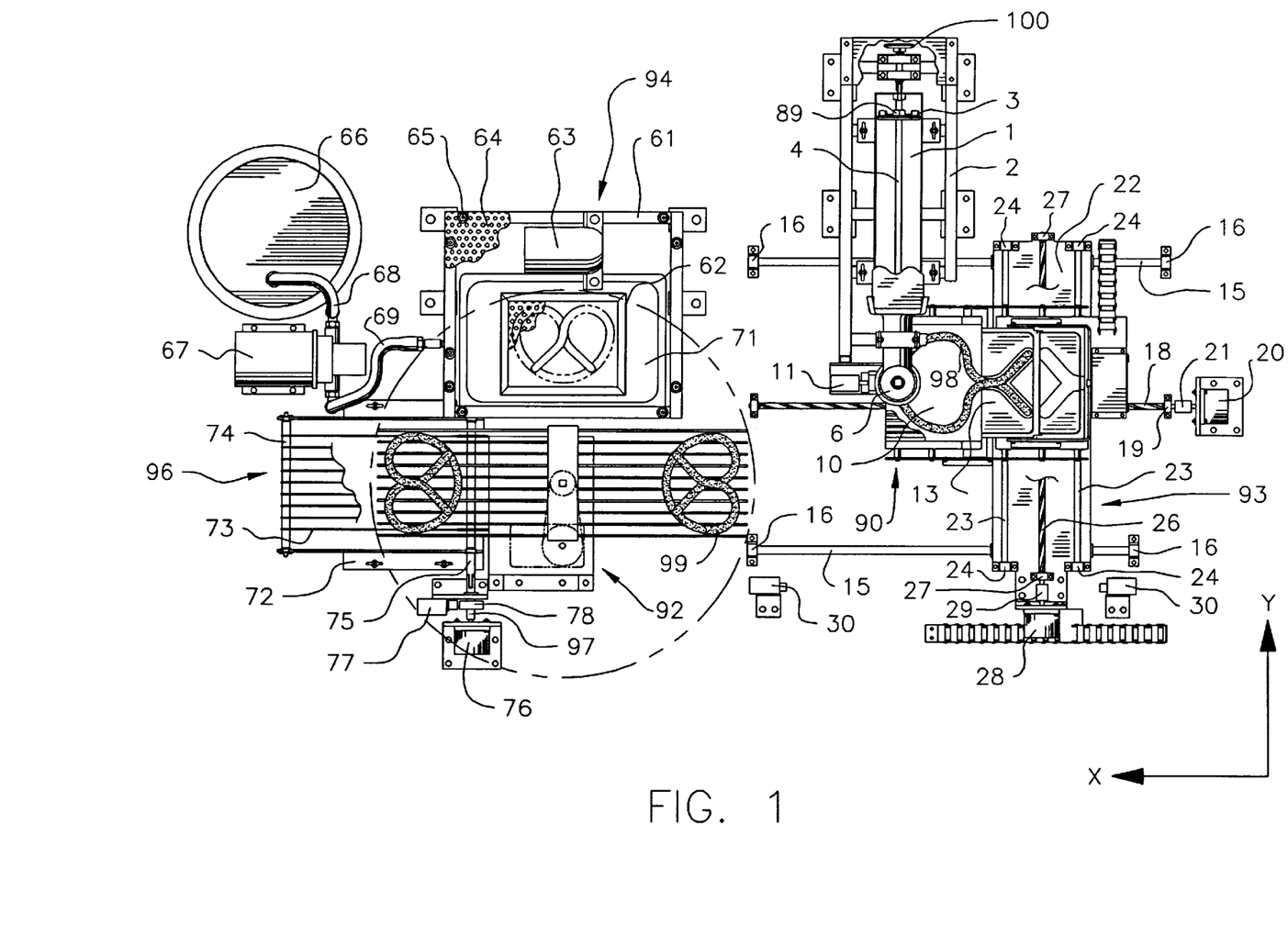
FIG. 1 is a plan view of the present invention with the extruder drive belt cassette and motor removed for clarity.
Figure 2:
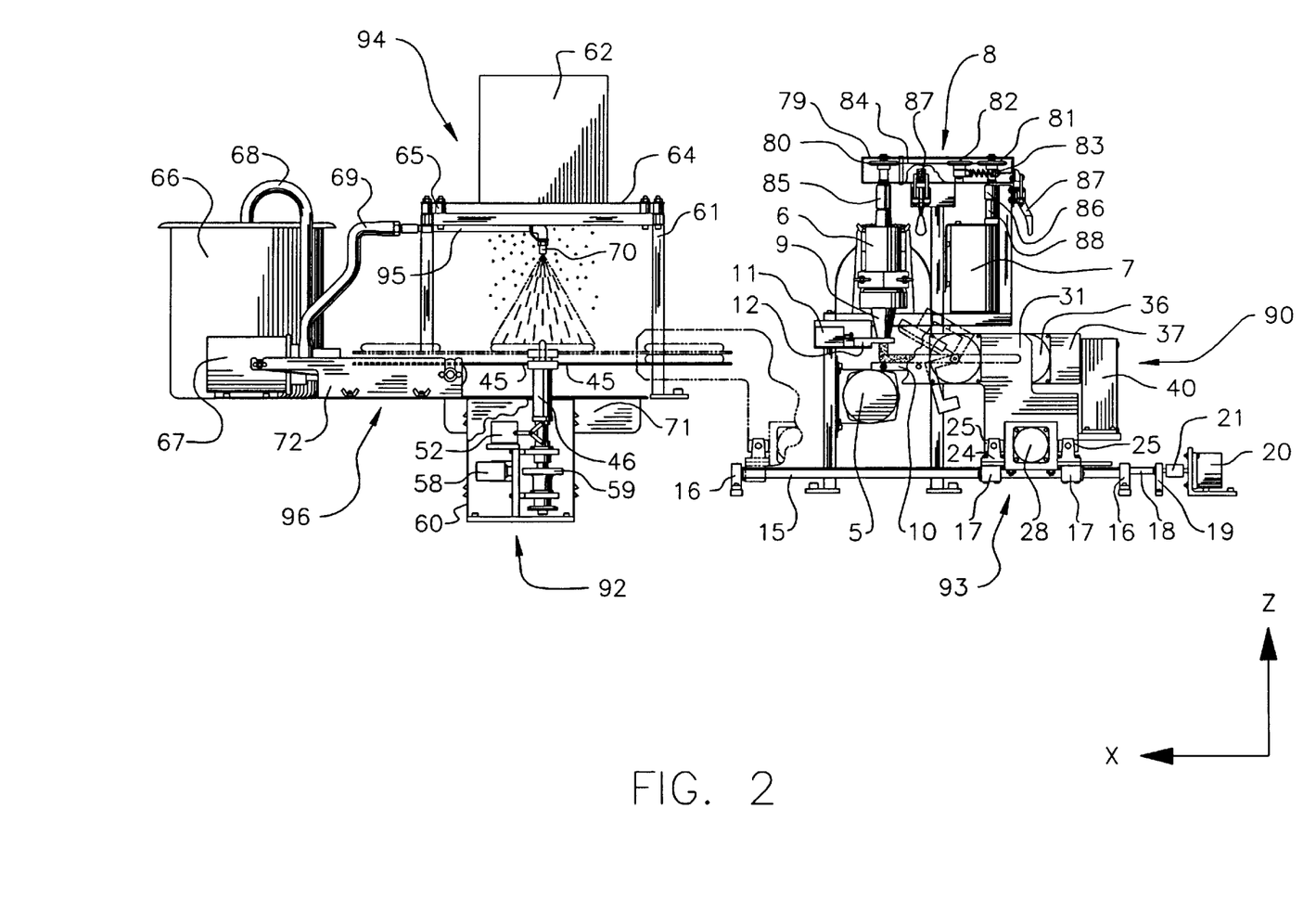
FIG. 2 is a side elevation of the present invention.
Figure 3:
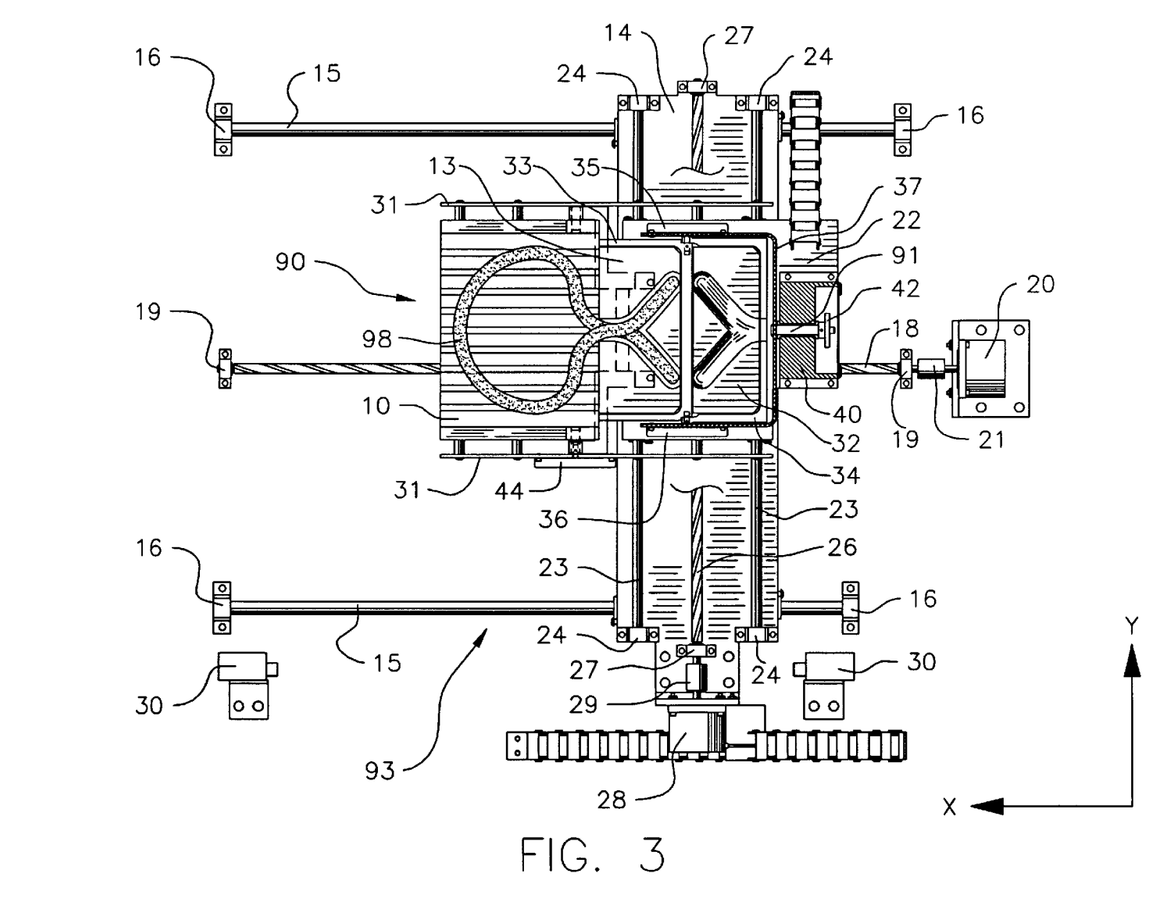
FIG. 3 is a plan view of the folding table on the X-Y positioning stage.
Figure 4:
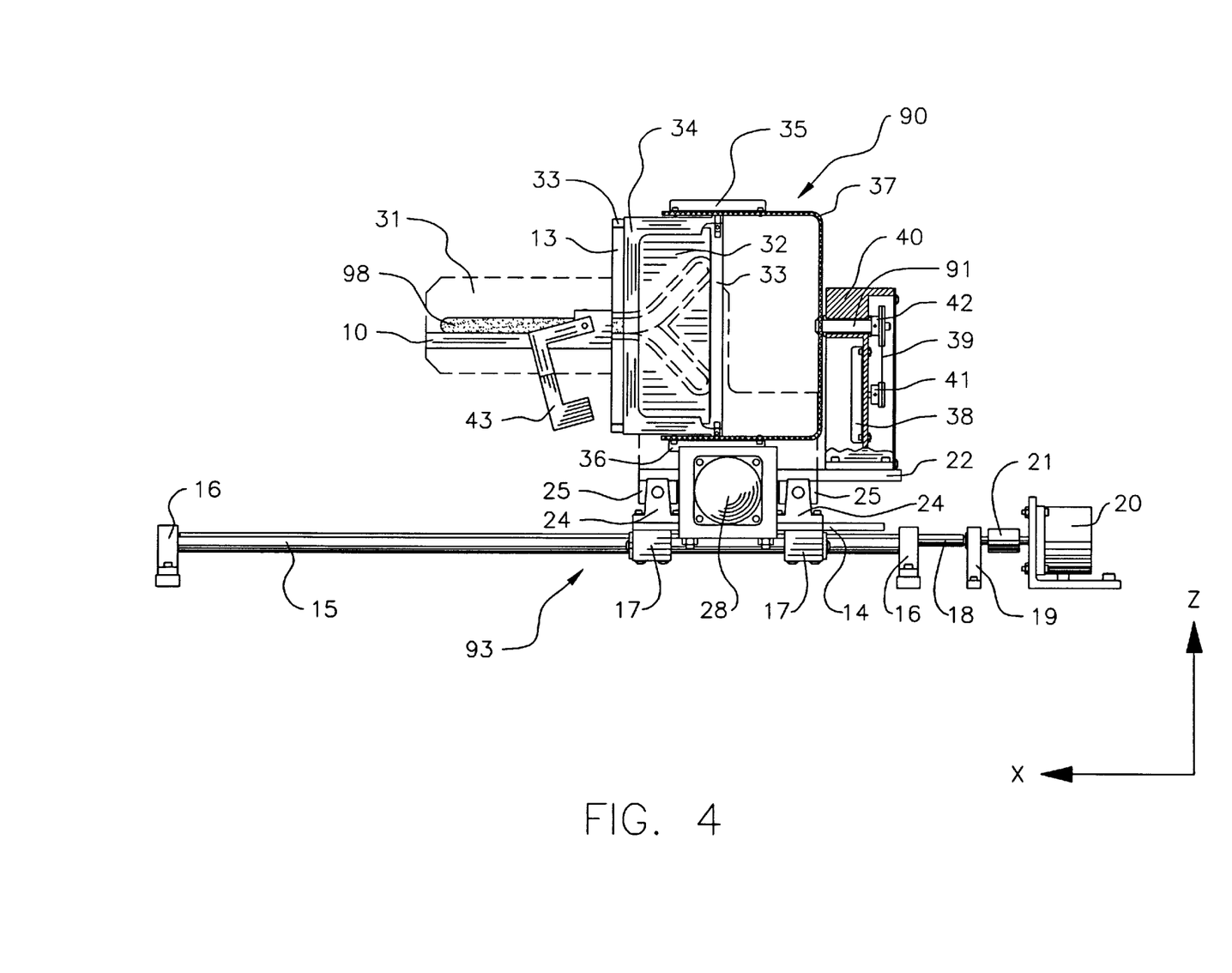
FIG. 4 is a side elevation of the folding table on the X-Y positioning stage shown in the middle of the twisting process.

Referring to FIGS. 1, 2, and 3, the extrusion portion of the pretzel making process begins by placing pre-mixed, unbaked pretzel dough into the dough bin 1, which is bolted to the extruder frame 2. The dough is fed to the extruder 6 by means of a flat plate dough pusher 3 located inside the dough bin 1. The dough pusher 3 is moved using a lead screw 4, also located in the dough bin 1, and a nut 89 welded to the dough pusher. The lead screw 4 is powered by an electric motor 5 mounted to the extruder frame 2 and a drive belt 100. The dough is forced through the extruder nozzle 9 by means of an auger (not shown) located inside the extruder 6. The extruder 6 is powered by an electric motor 7 mounted to the extruder frame 2. Power is transferred from the motor 7 to the extruder 6 using a removable drive belt cassette generally shown as 8. The drive belt cassette 8 is a self contained unit comprised of an aluminum housing 79 which contains the motor pulley 81, the extruder pulley 80, the belt tensioner pulley 82, the belt tensioner spring 83, and the drive belt 84. The extruder pulley 80 is attached to the extruder shaft 85 and the motor pulley 81 is attached to the motor shaft 86. Power is transferred from the motor pulley 81 to the extruder pulley 80 through the drive belt 84. Drive belt tension is maintained by the belt tensioner spring 83 applying constant force on the belt tensioner pulley 82. Both the extruder shaft 85 and the motor shaft 86 protrude from the cassette housing 79 and have square holes on their protruding ends. The square hole of the extruder shaft 85 fits over the square portion of the auger shaft (not shown) which extends out from the extruder 6 in the Z direction on the end opposite of the nozzle 9. The square hole of the motor shaft 86 fits over the square portion of a motor shaft adapter 88 which is fastened to the extruder motor 7. When the drive belt cassette 8 is set in place over the square ends of the auger shaft and the motor shaft adapter 88, it is held in place on the extruder frame 2 by means of two hold down toggle clamps 87. This set up allows for easy removal and replacement of the entire drive belt system without any tools so that the baking staff can have daily access to the dough extruder system for cleaning.

The dough is extruded through the nozzle 9 and on to a slotted table 10 and in to the y-shaped hollowed out portion of one of the dough twist stabilizer inserts 13 forming the first stage of the pretzel shape 98. The first stage of the pretzel shape 98, best seen in FIG. 3, consists of a round section of the extruded dough rope with its ends crossed into a y-shaped pattern. The y-shaped portion of the extruded dough rope 98, with one end passing over top the other, provides the first half of the twist. The slotted table 10 and the dough twist stabilizer insert 13 are part of the folding table unit generally shown as 90. The components of the folding table unit 90 are held in place between the two folding table side plates 31. To achieve the first stage of the pretzel shape 98, the entire folding table unit 90 is moved in the X and Y directions as the dough is extruded through the nozzle 9. The folding table unit 90 is fastened to the Y-direction base plate 22 to obtain its motion in the Y-direction. There are four linear bearings 25 fastened to the Y-direction base plate 22 which slide along two parallel shafts 23. Shaft holders 24 support the two parallel shafts 23 at both ends. Motion in the Y direction is provided by a lead screw 26 and the lead screw nut (not shown) which is attached to the bottom of the Y-direction base plate 22. The lead screw 26 is powered by the Y-direction stepper or servo motor 28 and is coupled to the motor by the stepper or servo motor coupling 29. The lead screw 26 is supported at both ends by plain bearings (not shown) and the lead screw holders 27. To obtain its motion in the X-direction, the folding table unit 90 and the Y-direction portion of the positioning stage are fastened to the X-direction base plate 14. The Y-direction linear shaft holders 24 and the Y-direction lead screw mounts 27 are fastened to the top of the X-direction base plate 14. There are four linear bearings 17 fastened to the bottom of the X-direction base plate 14 which slide along two parallel shafts 15 in the X direction. Linear shaft holders 16 support the two shafts 15 at both ends. The X-direction lead screw 18 and the lead screw nut (not shown) which is fastened to the bottom of the base plate 14, provide the means for moving the folding table unit 90 in the X-direction. The X-direction lead screw 18 is supported at both ends by plain bearings (not shown) and the lead screw mounts 19. The X-direction stepper or servo motor 20 provides power to the lead screw 18 and is coupled to it by the X-direction stepper or servo motor coupling 21. When the required amount of dough has been extruded into the first stage of the pretzel shape 98, the dough cutter solenoid 11 is activated and the dough cutter knife (not shown) slides through knife blade support 12 cutting the dough rope off just under the extruder nozzle 9.

Figure 5:
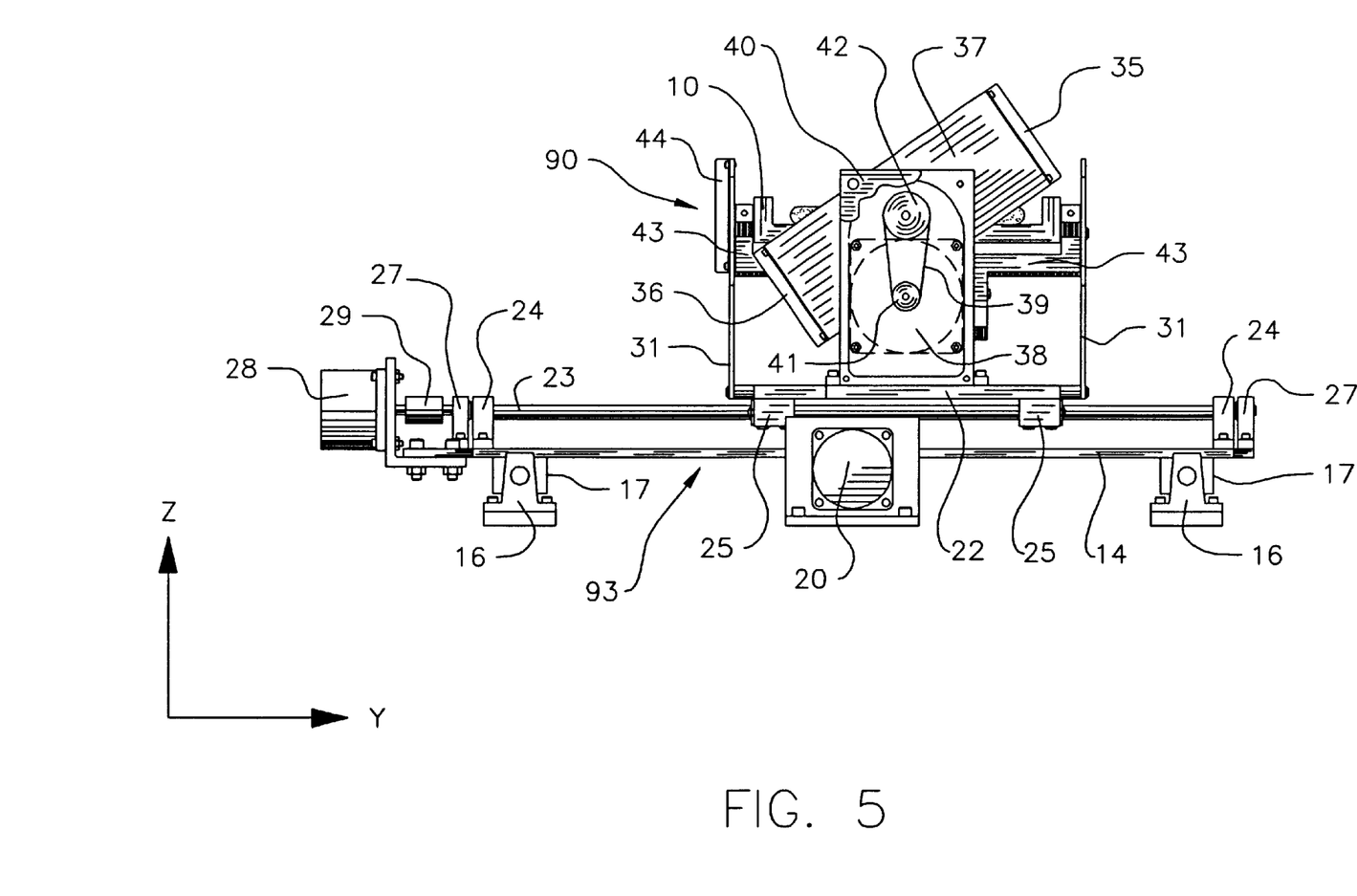
FIG. 5 is a rear elevation of the folding table on the X-Y positioning stage illustrating the pretzel twisting process.

Referring to FIGS. 3–6, once the dough has been extruded and the dough rope cut off at the nozzle, the folding table unit 90 and the X-Y positioning stage move to the maximum distance in the negative Y direction to begin the twisting and folding process. During the extrusion process, part of the dough is extruded into the y-shaped hollowed out portion of the dough twist stabilizer insert 13. The y-shaped groove in the insert 13 and opposing insert 32 accommodates the y-shaped portion or tail of the extruded dough rope 98 and is as deep as half the thickness of the dough rope. The insert 13 rests on the stabilizer insert frame 33, which is coupled to the twist stabilizer stepper motor 35. To begin the twisting process, the opposing twist stabilizer frame 34 and insert 32 rotate 180 degrees and close over top of the y-shaped portion of the extruded dough shape 98, the other twist stabilizer insert 13 and frame 33. The opposing twist stabilizer stepper motor 36 powers the opposing twist stabilizer frame 34 and insert 32. When in the closed position, the y-shaped portion of dough is totally enclosed between the two stabilizer inserts 13 and 32 which allows the extruded dough 98 to maintain its shape as it is twisted. The stabilizer inserts 13 and 32, the stabilizer insert frames 33 and 34, and the twist stabilizer stepper motors 35 and 36 are attached to the twist yoke 37 which allows them to rotate with the yoke 37 as the dough is twisted. With both halves of the twist stabilizer enclosing the y-shaped portion of dough, the twist yoke 37 is rotated 180 degrees, giving the dough a total of one full twist. This is best seen in FIG. 5. Attached to the twist yoke 37 is the twist yoke shaft 91, which extends into the twist motor housing 40 through two plain bearings (not shown). The twist motor housing 40 is fastened to the Y-direction base plate 22. The twist yoke stepper motor 38, which is mounted to the twist yoke housing 40 powers the twist yoke 37. There is a pulley 41 fastened to the twist yoke stepper motor 38 and another pulley 42 fastened to the twist yoke shaft 91. Power is transferred from the stepper motor 38 to the twist yoke 37 through the drive belt 39.

Figure 6:
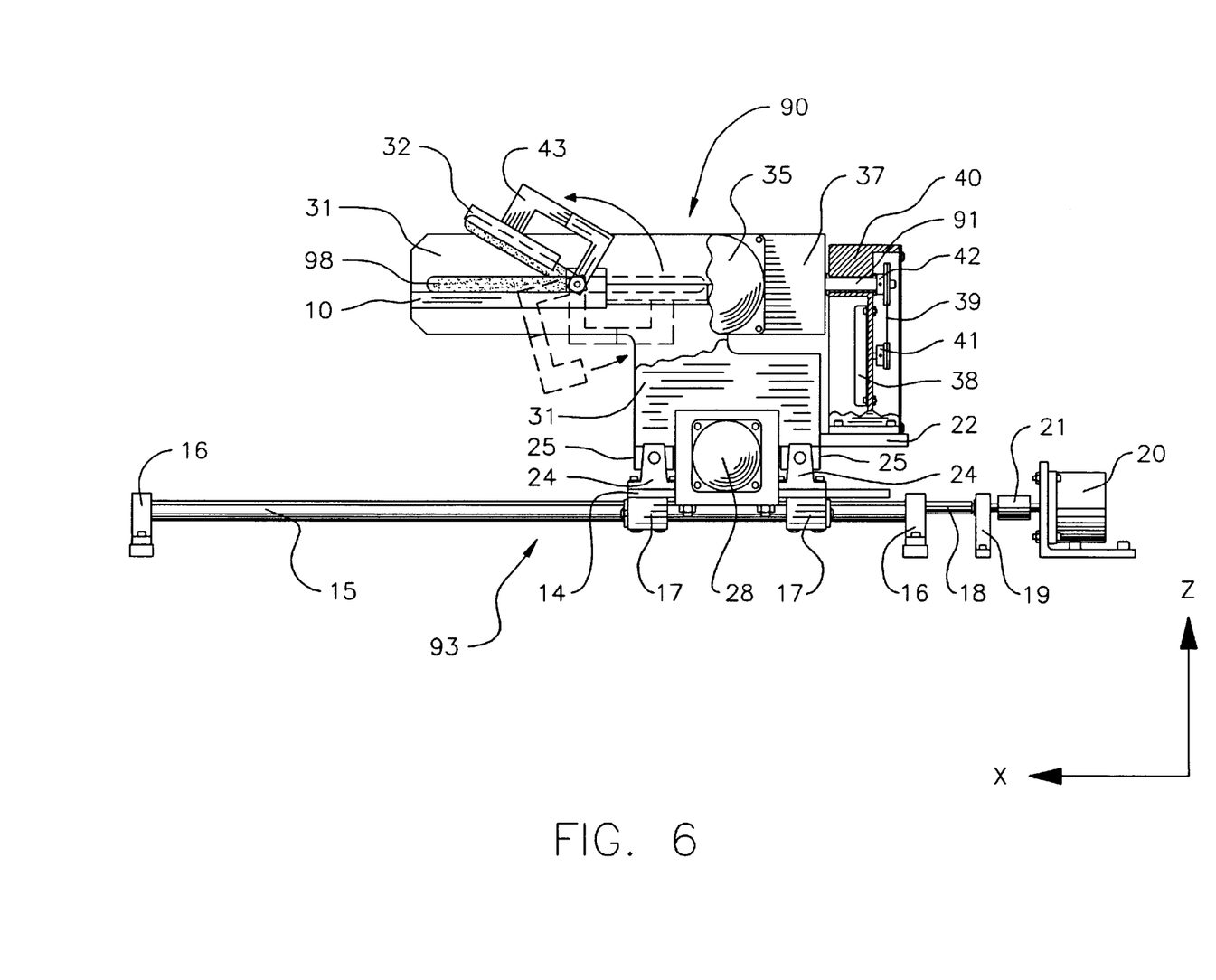
FIG. 6 is a side elevation of the folding table on the X-Y positioning stage showing the pass through flipper during the pretzel folding process.

After the dough is twisted, the stabilizer insert 32 and frame 34 which had closed over the top of the dough is now on the bottom and the stabilizer insert 13 and frame 33 are now on the top. The twist stabilizer stepper motor rotates the stabilizer insert 13 and frame 33 180 degrees opening the enclosed portion of dough. This final position for the stabilizer insert 13 and frame 33 and stabilizer insert 32 and frame 34 will be the starting position for the next pretzel to be made. With the stabilizer inserts and their corresponding frames in the open position, the twisted pretzel dough is ready to be folded. The pass through flipper 43 is powered by the flipper stepper motor 44 mounted to the folding table side plate 31. The pass through flipper 43 rotates counterclockwise 75 degrees to make contact with the stabilizer insert 32. Once contact has been made, the pass through flipper 43 lifts the stabilizer insert 32 out of the stabilizer insert frame 34. The pass through flipper 43 and the stabilizer insert 32 continue to rotate together through 150 degrees folding the twisted Y-shaped portion of dough laying it on top of the remaining portion of the extruded dough shape. This is best shown in FIG. 6. The folding process gives the final pretzel shape 99. The pass through flipper 43 and the stabilizer insert 32 then rotate clockwise 150 degrees setting the insert 32 back in its frame 34. The pass through flipper 43 continues to rotate clockwise 75 degrees back to its original position. Once the pretzel folding process has been completed, the entire folding table unit 90 is moved by the X-Y positioning stage to its maximum position in the positive X direction triggering the limit switch 30.

Refer to FIGS. 1, 2, 7, and 8. As the folding table unit 90 is moved in the X direction to the pick up position, the forks 45 of the lift and rotate unit, generally shown as 92, slide into the slots on the slotted table 10 under the folded pretzel 99. This will allow the lift and rotate unit to pick up the pretzel 99 and rotate it to the next station. To lift the pretzel 99, the lift solenoid 52 is activated which causes the toggle linkage 53 to exert an upward force on the lift collar 54. Resting on the lift collar 54 is the thrust bearing 55 and fork unit 46. The lift collar 54, thrust bearing 55, and the fork unit 46 all slide in the Z-direction on the spindle 47. The fork unit 46 holds both sets of forks 45, which are the parts that actually touch the pretzel 99 when the pretzels are moved from station to station. The thrust bearing 55 allows the fork unit 46 to rotate with the spindle 47 even when in the lifted position. The top portion of the spindle 47 is square and fits through a square hole in the fork unit 46. This allows the spindle 47 to drive the fork unit 46 as it rotates on the thrust bearing 55 and also allows the fork unit 46 to be removed with no tools for cleaning. The spindle 47 rotates inside 2 plain bearings 56, which are held in place by two component hangers 57 that are fastened to the lift and rotate housing 60. The electric motor 48, fastened to the housing 60, provides power to the spindle 47. A pulley 50 is fastened to the spindle 47 and another pulley 49 is fastened to the motor 48. Power is transferred from the motor to the spindle through the drive belt 51. The rotational position of the forks 45 and fork unit 46 is provided by a four position cam 59 fastened to the spindle 47 and a limit switch 58 fastened to the housing 60. The four position cam 59 activates the limit switch 58 in four positions 90 degrees apart signaling four different stations.

When the forks 45 lift the pretzel 99 from the slotted table 10 of the folding table unit 90, it rotates counterclockwise 90 degrees to the salt and soda spray station, generally shown as 94. Once the pretzel 99 is rotated under the salt shaker frame 61, it is subjected to a patterned spray of soda water from the soda water spray nozzle 70. The soda water pump 67 pumps the soda water solution from its container 66 through the inlet hose 68 and to the outlet hose 69. The outlet hose is connected to a small pipe 95, which runs to the spray nozzle 70 providing the patterned soda water spray. Any over spray and excess soda water on the pretzel 99 land in the salt and soda water catch pan 71. After the pretzel 99 receives the soda water spray, the salt shaker vibrator 63 is activated and the pretzel 99 is salted. The baking staff loads salt into the salt bin 62, which is mounted on top of a perforated sheet 64. The vibrator 63 is also mounted on top of the perforated sheet 64. When the vibrator 63 is activated, it forces salt to shake through the holes of the perforated sheet 64. Any excess salt that does not stick to the pretzel 99 falls into the salt and soda water catch pan 71. The perforated sheet 64 is mounted to the salt shaker frame 61 with vibration mounts 65. This isolates the vibration from the salt shaker frame 61 and the rest of the machine.

When the pretzel 99 is finished being salted, the forks 45 rotate counterclockwise another 90 degrees to bring the pretzel 99 to the unload conveyor generally shown as 96. The unload conveyor 96 is comprised of the conveyor frame 72, which holds the conveyor belt roller 74 and the conveyor belt drive pulley shaft 75. A series of o-ring conveyor belts 73 run between the conveyor belt roller 74 and drive pulley shaft 75. The conveyor motor 76 powers the conveyor drive pulley shaft 75. The drive pulley shaft 75 is driven by the motor shaft 97, which is fastened to the motor 76. The motor shaft 97 is slotted on one end, which fits over a flat on the drive pulley shaft 75. This allows the entire unload conveyor 96 to easily be removed for cleaning while the stepper motor 76 and motor shaft 97 remain fastened to the machine. To remove the unload conveyor 96, the flat on the drive pulley shaft 75 and the slot on the motor shaft 97 must be perpendicular to the X-Y plane and gives two possible shaft positions 180 degrees apart for removal. For the machine to sense that the motor shaft 97 and the drive pulley shaft 75 are in the right position, a two position cam 78 is fastened to the motor shaft 97. The cam 78 will activate a limit switch 77 in two positions 180 degrees apart to signal if the unload conveyor can be removed.

After the forks 45 rotate the pretzel 99 over the unload conveyor 96, the lift solenoid 52 on the lift and rotate unit 92 retracts, lowering the pretzel 99 onto the o-ring conveyor belts 73. The o-ring conveyor belts 73 are spaced so that the forks 45 can pass through them. The forks 45 also drop below the level of the o-ring conveyor belts 73 so that there is no longer contact between the forks 45 and the pretzel 99. Once the pretzel 99 is resting only on the o-ring conveyor belts 73, the conveyor stepper motor 76 is activated and the pretzel 99 is conveyed away from the forks 45 and to the conveyor of an impinger type oven or other suitable baking apparatus. After the pretzel 99 is unloaded, the lift solenoid 52 on the lift and rotate unit 92 is energized raising up the forks 45. The forks 45 are then rotated counterclockwise 90 degrees to an idle station to possibly be used for additional condiment application. The forks 45 are again rotated counterclockwise another 90 degrees back to the starting position where the lift solenoid 52 retracts lowering the forks 45 to be ready to pick up the next pretzel from the slotted table 10.

Figure 7:
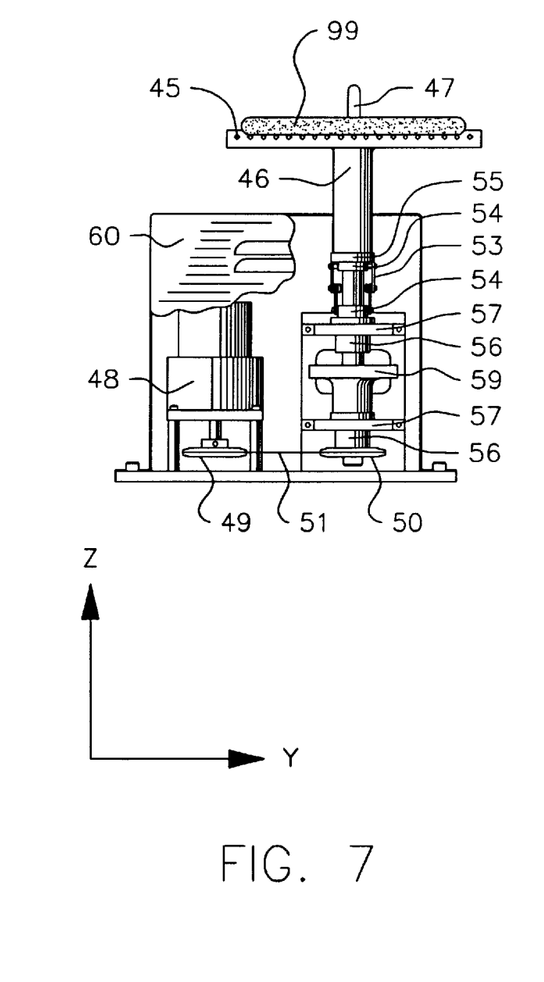
FIG. 7 is a rear elevation of the lift and rotate transfer table.
Figure 8:
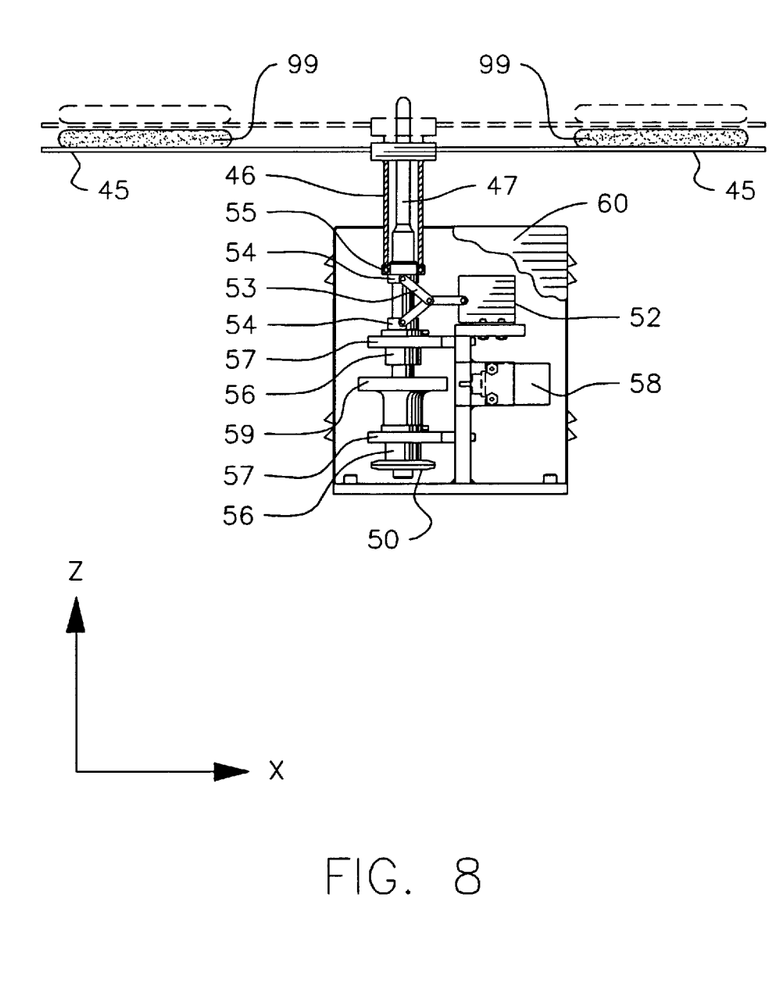
FIG. 8 is a side elevation of the lift and rotate transfer table.

The fork unit 46 of the lift and rotate assembly 92 contains two sets of forks 45 that are 180 degrees apart. Both sets of forks 45 lift and rotate at the same time, allowing some events to be happening simultaneously. Unless there is a fourth station in use, these simultaneous events happen at the unload conveyor 96 and at the pretzel pick up at the folding table unit 90. When the forks 45 are lifted to pick up the pretzel 99 off the slotted table 10, the opposite set of forks 45 are lifting up past the o-ring conveyor belts 73 ready to rotate to the next station. The same is true when the forks 45 are lowered to enter the slots of the slotted table 10 and at the same time the opposite set of forks is setting the pretzel 99 down on the o-ring conveyor belts 73 to be unloaded.

What is claimed is:

1. A pretzel making apparatus comprising means for loading pretzel dough, a folding table, means for extruding the pretzel dough into a rope-like configuration onto said folding table, said folding table comprising a plurality of inserts including a first insert which supports the pretzel dough when extruded into a rope-like configuration and second and third inserts operatively connected and associated to cooperate with the ends of the rope-like configuration of pretzel dough, and means for rotating said second and third inserts causing the ends of the rope-like configuration of pretzel dough to be rotated to provide a knot of pretzel dough as the first insert remains substantially stationary, said rotating means causing said second and third inserts to be rotated to their respective original positions after said knot of pretzel dough has been formed.

2. The apparatus as defined in claim 1 further including means for folding the ends of the rope-like configuration of pretzel dough substantially onto itself after said knot of pretzel dough has been formed so as to form the traditional pretzel shape.

3. The apparatus as defined in claim 2 including means for transferring said formed pretzel from said folding table to another processing station.

4. The apparatus as defined in claim 3 wherein said another processing station includes means for applying soda water on said formed pretzel.

5. The apparatus as defined in claim 4 wherein said processing station further includes means for applying salt onto said formed pretzel after soda water has been applied thereto.

6. The apparatus as defined in claim 5 further including means for removing said for pretzel from said processing station after soda water and salt have been applied thereto.

7. The apparatus as defined in claim 4 wherein said soda water applying means comprises spraying means.

8. The apparatus as defined in claim 1 wherein said plurality of inserts is removable from said apparatus for cleaning purposes.

* * * * *